United States Patent [19]

Jennings, Jr.

[11] Patent Number: 4,819,727
[45] Date of Patent: Apr. 11, 1989

[54] METHOD FOR SUSPENDING WELLS
[75] Inventor: Alfred R. Jennings, Jr., Plano, Tex.
[73] Assignee: Mobil Oil Corporation, New York, N.Y.
[21] Appl. No.: 887,687
[22] Filed: Jul. 21, 1986
[51] Int. Cl.⁴ .......................................... E21B 33/138
[52] U.S. Cl. ........................... 166/292; 166/293; 166/295
[58] Field of Search ............... 166/292, 293, 294, 295

[56] References Cited

U.S. PATENT DOCUMENTS

| | | | |
|---|---|---|---|
| 2,332,822 | 10/1943 | Williams | 166/292 |
| 3,196,619 | 7/1965 | Shock | 166/294 X |
| 3,227,212 | 1/1966 | Black et al. | 166/294 |
| 3,447,608 | 6/1969 | Fry et al. | 166/294 X |
| 3,613,790 | 10/1971 | Stout et al. | 166/294 |
| 3,878,895 | 4/1975 | Wieland et al. | 166/294 |
| 4,016,931 | 4/1981 | Cryar, Jr. | 166/276 |
| 4,265,311 | 5/1981 | Ely | 166/271 |
| 4,275,788 | 6/1981 | Sweatman | 166/294 X |
| 4,333,461 | 6/1982 | Muller | 604/368 |
| 4,343,363 | 8/1982 | Norton et al. | 166/295 X |
| 4,378,049 | 3/1983 | Hsu et al. | 166/294 X |
| 4,498,539 | 2/1985 | Bruning | 166/295 X |
| 4,569,393 | 2/1986 | Bruning et al. | 166/295 X |
| 4,601,339 | 7/1987 | Jennings, Jr. | 166/281 |
| 4,649,999 | 3/1987 | Sandy et al. | 166/295 |
| 4,662,445 | 5/1987 | Gupta | 166/273 X |
| 4,664,191 | 5/1987 | Jennings, Jr. | 166/276 |
| 4,679,629 | 7/1987 | Abdo et al. | 166/281 |
| 4,694,727 | 9/1987 | Jones et al. | 86/20.15 |
| 4,703,799 | 11/1987 | Jennings, Jr. et al. | 166/276 |

Primary Examiner—Stephen J. Novosad
Attorney, Agent, or Firm—Alexander J. McKillop; Charles J. Speciale; Charles A. Malone

[57] ABSTRACT

A method for killing and suspending hydrocarbonaceous fluid production, particularly oil and/or gas, in a formation containing same which minimizes formation damage. A solidifiable pumpable gel mixture is placed via a wellbore into the formation's productive interval and also within said wellbore. Said mixture solidifies in the formation and forms a gel plug within the wellbore. Thereafter, a light weight cement is placed over said gel plug effectively "killing" and suspending the production of hydrocarbonaceous fluids.

18 Claims, 1 Drawing Sheet

METHOD FOR SUSPENDING WELLS

FIELD OF THE INVENTION

This invention is directed to a method for minimizing formation damage when a well is "killed" and production is suspended.

BACKGROUND OF THE INVENTION

When productive intervals are completed in exploratory wells, it is common practice to "suspend" wells for a period of time to allow construction of pipelines and gathering facilities in conjunction with field development. In remote locations (offshore, e.g.), it may even be necessary to plug and abandon zones found productive until development wells can be drilled.

In many cases, it is not known how long a well may be suspended. Therefore, thorough measures are taken to isolate the productive interval from the surface. For example, following a flow test of the zone indicating productively at commercial rates, the zone will be "killed" with completion fluid, a bridge plug set above the perforated interval, and a cement plug placed on top of the bridge plug. Two or three additional bridge plug/cement plug combinations may be placed above the interval to insure zone isolation during suspension.

When the suspended well is re-entered to open the interval to production, the plugs must be drilled out. Frequently this results in substantial loss of drilling fluid to the zone. This is especially true if the zone was stimulated (fracturing or acidizing, e.g.) as part of the initial well test program. Once the plugs are drilled out, the zone is opened to production, usually at a lower rate than the initial test rate because of damage which occurred during re-entry.

Therefore, what is needed is a method which will allow a producing well to be "killed" and suspended without causing undue formation damage. Utilization of said method would result in maintaining the producing rate near that initially determined. Well re-entry costs would be reduced, and formation damage minimized.

SUMMARY OF THE INVENTION

This invention is directed to a method for "killing" and suspending oil and/or gas production in a well which results in a reduction in formation damage. In the practice of this method, a pumpable solidifiable gel mixture is placed into the wellbore substantially at the formation's productive interval. Subsequently, the gel mixture solidifies after entering said productive interval of the formation while causing a solid gel plug to form in the wellbore substantially in the area of the wellbore's productive interval. Said solidified gel mixture within the formation and the wellbore is sufficient to withstand environmental conditions in the formation depths, including pressures. As a result of the solidified gel mixture in the formation and gel plug within the wellbore, hydrocarbonaceous fluids including oil, gases, and mixtures thereof cease to flow from the formation into said wellbore, thus "killing" the well.

Thereafter, the depth of the top of the solid gel plug is determined so that a desired amount of light (low density) concrete can be placed over said gel plug. Next, a desired amount of a light concrete is placed over said gel plug in an amount sufficient to suspend the production of hydrocarbonaceous fluids from said formation to the surface.

It is therefore an object of this invention to eliminate the need for a kill or completion fluid when "killing" a well.

It is another object of this invention to eliminate the need for a bridge plug when well production is suspended.

It is yet another object of this invention to minimize formation damage resultant from loss of drilling fluid which in prior art methods often entered the productive interval of a formation thereby decreasing the formation's permeability.

It is a yet further object of this invention to reduce well re-entry cost upon termination of the well suspension period.

It is a still yet further object of this invention to maintain the production rate substantially near the initial production rate upon termination of the well suspension period.

DESCRIPTION OF THE PREFERRED EMBODIMENTS

Figure 1:
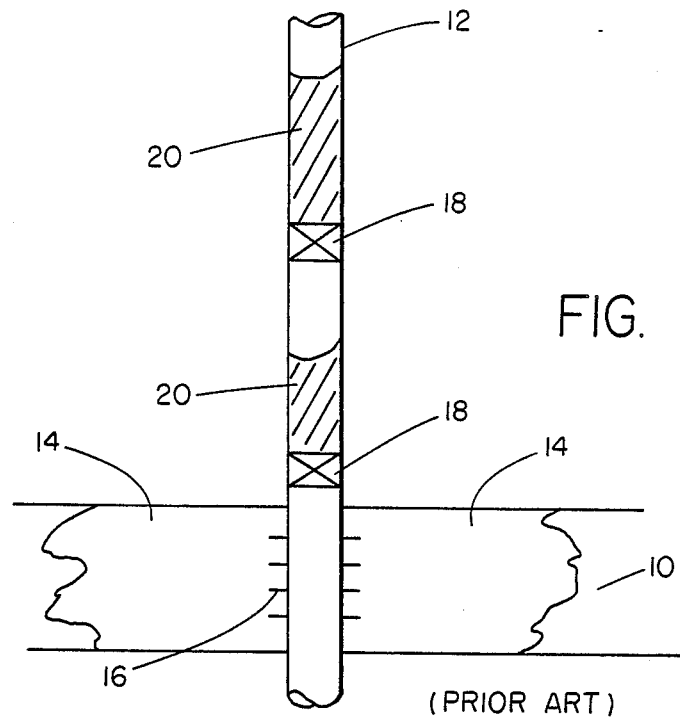
FIG. 1 is schematic representation of a prior art method for "killing" and suspending oil production in a well.

When "killing" a productive interval of a well, as shown in FIG. 1, a kill fluid 14 is generally injected in wellbore 12. Said kill fluid enters formation 10 via perforations 16 causing a "drowning" of the productive interval in formation 10. Thereafter, a bridge plug 18, which is generally of a metallic construction, is caused to bind securely against wellbore 12. Once bridge plug 18 is securely bound, a cement plug 20 is placed on top of the bridge plug and hardens causing the productive interval of wellbore 12 to be closed to the surface and thereby suspend oil production into said wellbore. To more effectively secure the productive interval against oil production, multiple cement plug/bridge plug combinations can be utilized in wellbore 12 as is shown in FIG. 1.

Figure 2:
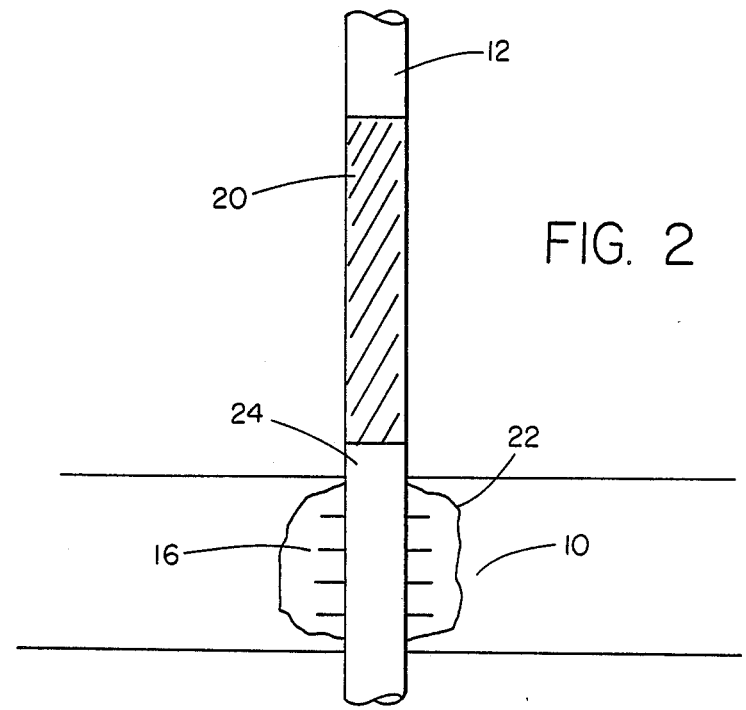
FIG. 2 is schematic representation of the method which is disclosed herein.

In the practice of this invention, as is shown in FIG. 2, a pumpable solidifiable gel mixture is directed into wellbore 12. Said gel mixture is allowed to flow down wellbore 12 in formation 10 unit it comes in contact with the productive interval of formation 10. At the productive interval, said gel mixture enters the productive interval of formation 10 via perforations 16. Sufficient solidifiable gel is allowed to enter said productive interval thereby closing off said interval to production of hydrocarbonaceous fluids, particularly oil. Additional solidifiable gel material is allowed to enter the wellbore 12 which material contacts said productive interval until said gel has filled said wellbore 12 above the productive interval.

The solidifiable gel material subsequently forms a solid gel plug 24 within wellbore 12. It also forms a solid formation gel 22 in the productive interval of formation 10. Gel plug 24, upon solidification, is of a composition and strength sufficient to support a cement plug 20 thereabove. Cement plug 20 is comprised of a light (low density) cement. Representative cements are foamed cements and a light cement sold by Halliburton under the Spherelite tradename. Similar cement compositions are disclosed in U.S. Pat. Nos. 3,902,911 and 4,120,360 which are hereby incorporated by reference. As is known to those skilled in the art, cement composition can vary from those having a high density, as used in road construction, to those having a density sufficiently low which would allow it to float on top of the gel plug. When it is desired to commence production of hydrocarbonaceous fluids from said formation, cement plug 20 is drilled out and gel plug 24 caused to be removed. Said removal can be accomplished by mechanical or chemical means. Since the productive interval of formation 10 is closed from wellbore 12 by the solidified gel, and pressurized drilling fluid utilized to remove cement plug 20 from wellbore 12 will not enter the productive interval and damage it.

Since a kill fluid is not utilized in this invention, hydrocarbonaceous fluids, particularly oil, are produced through said productive interval at substantially the initial production rate. Re-entry costs are substantially reduced since more costly drill bits are not required as a metallic bridge plug is not used.

One method of making a suitable pumpable mixture is discussed in U.S. Pat. No. 4,333,461 issued to Muller on June 8, 1982 which is hereby incorporated by reference. The stability and rigidity of the gel plug 24 will depend upon the physical and chemical characteristics of the gel plug. As is known to those skilled in the art, gel plug 24 stem should be of a stability and rigidity which will withstand the weight of cement plug 20 and environment well conditions.

Often, it will be necessary to increase the density of the pumpable gel to obtain the desired stability and rigidity therein. To accomplish this a solid non-reacting material can be added to the pumpable gel mixture. Preferred non-reacting solid materials include solid rock salt, calcium carbonate, and suitably crushed mollusk shells, such as oyster shells.

Other gel mixtures can be used to obtain the desired stability and rigidity. A preferred mixture used to obtain the desired stability and rigidity, for example, is a mixture of hydropropyl guar cross liked with transitional metal sand ions thereof. The purpose of the transitional metal ions is to provide increased strength, stability and rigidity for the gel plug stem 22.

Hydropropyl guar is placed into the gel mixture in an amount of from about 0.70 to about 10.0 weight percent of said mixture. As preferred, hydropropyl guar is placed in said mixture in about 7.2 percent by weight of said mixture.

Metallic ions which can be used in the pumpable gel mixture include titanium, zirconium, chromium, antimony and aluminum. The concentration of these transitional metals in the pumpable gel fluid will of course vary depending upon the environmental nature of the wellbore and formation. Although the exact amount of the metals required will vary depending on the particular application, it is anticipated that the metals should be included within the pumpable gel fluid in amounts of from about 0.005 weight percent to about 0.50 weight percent, preferably about 0.10 weight percent of said fluid.

It is often desirable, depending on the kill and suspension period, to have a gel stem plug 22 which will withstand a temperature range from about 300° F. to about 450° F. for from about 0.5 of a day to about 4 days. A thermally stable solid gel plug 24 and formation gel 22 can be obtained by mixing into the pumpable gel mixture a chemical known as an oxygen scavenger (such as sodium thiosulfate or short chain alcohols such as methanol, ethanol, and isopropanol), preferably sodium thiosulfate. The concentration of the oxygen scavenger utilized, of course, will depend upon the thermal stability desired to be obtained for the gel plug 24 and formation gel 22. However, as preferred, it is anticipated that the concentration of the oxygen scavenger in the pumpable gel mixture will be from about 0.10 percent by weight to about 0.75 percent by weight, preferably 0.50 percent by weight.

Cement plug 20 can be removed from wellbore 12 by drilling. However, the formation gel 22 and gel plug 24 can also be removed in several ways. Several variations ar provided for. One variation, which can be utilized to facilitate removal of the gel plug 24 from wellbore 12 and formation gel 22 is to form a solid gel plug 24 or formation gel 22 containing a gel breaker. This gel breaker, included in the gel mixture, is selected from a group of chemical compounds which can break down the solid gel at temperatures of less than from about 60° F. to about 250° F. Generally, this breakdown will occur within from about 2 hours to about 24 hours depending upon type and concentration of breaker added. Chemicals satisfactory for use as gel breakers, and which are incorporated into the gel mixture, include enzymes and oxidizing agents, suitable for breaking down the solid gel (such as sodium persulfate). Other gel breakers sufficient for this purpose are discussed in U.S. Pat. No. 4,265,311 issued to Ely on May 5, 1981, which is hereby incorporated by reference. These chemicals are readily available from chemical suppliers and with the exception of enzyme breakers are sold under their chemical names. Enzyme breakers can be obtained from oil field service companies. The concentration of the gel breaker incorporated into the gel mixture will vary from about 0.01 weight percent to about 0.10 weight percent, preferably about 0.05 weight percent of the gel mixture. Upon cooling to a temperature of from about 60° F. to about 150° F., the gel breaker will breakdown the solid gel causing it to liquify which will facilitate removal of gel plug 24 and formation gel 22.

Another method for breaking the gel is to contact the solidified gel with a mineral acid for removing cement plug 20 after a suitable or desired time interval. In those instances where it is undesirable to have a gel braker incorporated into the gel mixture to remove the solid gel plug 24 or formation gel 22, it is preferred to use hydrochloric acid of a strength sufficient to solubilize the solid gel plug 24 and formation gel 22 without attaching formation 10. Hydrochloric acid, and acids similar thereto, can be used to breakdown the solid gel on contact. Hydrochloric acid of a concentration of about 10 percent to about 28 percent preferably about 15 percent, by volume of solution, will generally be sufficient for this purpose. Although hydrochloric acid has been mentioned, other similar mineral acids and strong organic acids may be employed depending upon their availability, as is known to those skilled in the art.

In one example of the practice of this invention, a slurry is formed with 1,000 gallons of water. This slurry comprises about 40 pounds of base gel such as hydroxypropyl guar gum which forms a hydrate in the water. To this mixture is added about 600 pounds of hydroxypropyl guar gum which has been tested to provide delayed hydration and thickening proportions. Approximately 20 pounds of a buffer or catalyst suitable to obtain the desired pH and reaction time is added to this mixture. Cross-linking agents, such as borates and chromates, are then added in an amount of about 20 pounds.

Forty-two pounds of sodium thiosulfate, an oxygen scavenger, is then added to the mixture. This gel mixture is pumped into the formation 10 near the productive interval. After solidification of the mixture and the elapse of the desired suspension time, the solidified gel plug 24 and formation gel 22 are removed by contacting them with 15 volume percent of hydrochloric acid in an amount sufficient to solubilize the gel compositions.

In another example of the practice of this invention, a mixture is made as above. Additional components are placed into the mixture. About 420 pounds of crushed oyster shells are next added to the mixture. Titanium, in an amount of about 4 pounds, is added to the mixture. Approximately 170 pounds of potassium chloride is subsequently added to the mixture. Four pounds of sodium persulfate is added to the mixture. and serves as a gel breaker. Upon solidifcation, the gel plug 24 and formation gel 22 are capable of withstanding greater pressures. by chemical degradation, the gel stem is liquefied by the sodium persulfate gel breaker.

As is understood by those skilled in the art, the composition of a gel stem will depend upon many variables including formation conditions. The above examples are mentioned as two possible variations among many others.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

I claim:

1. A method for filling and suspending a well which minimizes formation damage comprising:
   (a) directing a pumpable solidifiable gel mixture into a wellbore and into the productive interval of a formation which mixture contains an oxygen scavenger material selected from the group consisting of sodium thiosulfate and a short chain alcohol;
   (b) causing said gel mixture to become a solid thereby forming a gel plug within said wellbore and a formation gel within said formation sufficient to withstand environmental formation conditions and pressures which cause hydrocarbonaceous fluids to flow into said wellbore from the formation areas near said wellbore; and
   (c) placing in said wellbore on top of said plug an amount of cement sufficient to isolate said productive interval while being supported by said plug.

2. The method as recited in claim 1 wherein the step (a) a solid non-reactant material is added to the pumpable gel mixture in an amount sufficient to increase the density of the pumpable gel.

3. The method as recited in claim 2 where in step (a) the non-reacting solid is a material selected from the group consisting of rock salt and calcium carbonate.

4. The method as recited in claim 1 where in step (c) said gel mixture solidifies after from about 2 to about 4 hours.

5. The method as recited in claim 1 where in step (b) the gel mixture forms a solid sufficient to withstand formation pressure from about 1,000 psig to about 80,000 psig.

6. The method as recited in claim 1 where in step (c) said gel plug and formation gel are able to withstand temperatures greater than about 500° F.

7. The method as recited in claim 1 where in step (a) the gel mixture becomes solid and is made thermally stable for temperatures of from about 350° F. to about 450° F. for from about 0.5 of a day to about 4 days.

8. The method as recited in claim 1 where in step (a) a gel breaker is added to the pumpable gel mixture in amounts sufficient to breakdown the solid gel in step (c) at temperature of less than from about 60° F. to about 250° F. within from about 2 hours to about 24 hours.

9. The method as recited in claim 1 where in step (a) an oxygen scavenger is placed in said gel mixture in a concentration of from about 0.10 percent by weight to about 0.75 percent by weight.

10. The method as recited in claim 1 where in step (a) said gel mixture contains a gel breaker capable of breaking down said solid gel at temperatures less than from about 60° F. to about 250° F. within from about 2 to about 24 hours.

11. The method as recited in claim 1 where in step (a) said gel mixture contains a gel breaker capable of breaking down said solid gel where said gel breaker is a material selected from the group consisting of an enzyme and an oxidizing agent.

12. The method as recited in claim 1 where hydrochloric acid in a concentration of from about 10 percent to about 28 percent by volume of solution is contacted with the gel plug after solidification to breakdown said solid gel to facilitate its removal from the wellbore.

13. The method as recited in claim 1 where in step (c) said cement is a light weight or foamed cement.

14. A method for killing and suspending a well which minimizes formation damage comprising:
   (a) directing a pumpable solidifiable gel mixtures into a wellbore and into the productive interval of a formation where said mixture contains hydropropyl guar cross linked with transitional metal ions and an oxygen scavenger material selected from the group consisting of sodium thiosulfate and a short chain alcohol;
   (b) causing said gel mixture to become a solid thereby forming a gel plug within said wellbore and a formation gel within said formation sufficient to withstand environmental formation conditions and pressures which cause hydrocarbonaceous fluids to flow into said wellbore from the formation areas near said wellbore; and
   (c) placing in said wellbore on top of said plug an amount of cement sufficient to isolate said productive interval while being supported by said plug.

15. The method as recited in claim 14 where in step (a) said gel mixture forms a solid sufficient to withstand formation pressures from about 1,000 psig to about 80,000 psig and is about to withstand a temperature greater than abut 500° F.

16. The method as recited in claim 14 where in step (a) said transitional metal is a member selected from the group consisting of titanium, zirconium, chromium, antimony and aluminum.

17. The method as recited in claim 14 where in step (a) said transitional metal is included within said pumpable gel mixture in an amount of from about 0.005 weight percent to about 0.50 weight percent of said mixture.

18. The method as recited in claim 14 where in step (a) said gel mixture contains a gel breaker capable of breaking down said solid gel, where said gel breaker is a material selected from the group consisting of an enzyme and an oxidizing agent.

* * * * *

UNITED STATES PATENT AND TRADEMARK OFFICE
CERTIFICATE OF CORRECTION

PATENT NO. : 4,819,727

DATED : April 11, 1989

INVENTOR(S) : Alfred R. Jennings, Jr.

It is certified that error appears in the above-identified patent and that said Letters Patent is hereby corrected as shown below:

Column 1, line 21, "productively" should read --productivity--.

Column 3, line 27, "environment" should read --environmental--.

Column 4, line 12, "ar" should read --are--.

Column 4, line 44, "braker" should read --breaker--.

Column 4, line 63, "tested" should read --chemically treated--.

Column 4, line 64, "proportions" should read --properties--.

Column 5, line 35, "filling" should read --killing--.

Column 5, line 52, "wherein the" should read --where in--.

Signed and Sealed this

Nineteenth Day of June, 1990

Attest:

HARRY F. MANBECK, JR.

*Attesting Officer*     Commissioner of Patents and Trademarks